UREA DERIVATIVES
Rudolf Hirt, Muri, near Bern, Switzerland, assignor to Dr. A. Wander S.A., Bern, Switzerland, a Swiss corporation
No Drawing. Filed Apr. 22, 1965, Ser. No. 450,170
Claims priority, application Switzerland, Apr. 24, 1964, 5,380/64
7 Claims. (Cl. 260—256.4)

This invention relates to new urea derivatives of the formula:

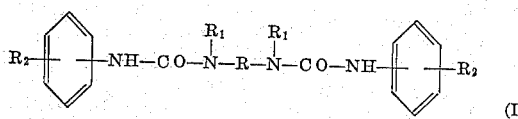
(I)

and acid addition salts thereof. In Formula I, R is a straight or branched alkylene group having from 2 to 12 carbon atoms, wherein a hydrogen atom may be substituted by a hydroxyl group. The two $R_1$ are either hydrogen atoms or represent together an ethylene group; in the latter case R is also an ethylene group. $R_2$ is a basic radical of the formula:

(II)

wherein $R_3$ represents a straight or branched alkylene group having from 2 to 4 carbon atoms, in which a hydrogen atom may be replaced by a hydroxyl group. $R_2$ can also denote a cyano or an esterified carboxyl group, especially an alkoxy carbonyl, which should be regarded as an inert precursor of the basic radical (II) in the reaction to be described later, and which can subsequently be converted in a way known per se via thioamide, imido ether, or imido thioether groups into a basic radical of the Formula II.

The dibasic urea derivatives according to Formula I and their acid addition salts have a powerful growth inhibiting effect on various bacteria and protozoa, especially on trypanosoma, and can therefore be used as chemotherapeutic agents.

The trypanocidal action is especially evident in those compounds in which there are 7 to 10 carbon atoms in the alkylene group R and 3 or 4 carbon atoms in the alkylene group $R_3$. Thus, among others 1,1'-heptamethylenebis[3 - (p - [1,4,5,6-tetrahydro-2-pyrimidinyl]phenyl) urea] dihydrochloride and 1,1'-nonamethylenebis[3-(p-[1,4,5,6-tetrahydro-2-pyrimidinyl]phenyl)urea] dihydrochloride are distinguished by strong trypanocidal action.

The further urea derivatives of Formula I according to the invention, wherein $R_2$ does not denote the basic radical (II) but a group convertible thereto (cyano or esterified carboxyl group) serve as intermediate products for the production of chemotherapeutically active compounds, especially of the above-mentioned dibasic compounds.

Urea derivatives of Formula I may be obtained by reacting an aromatic compound of the formula:

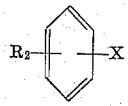
(III)

in which X is the isocyanate group (—NCO) or a reactive carbamic acid group, especially a carbamic acid halide group (—NH—CO—halogen) or a carbamic acid ester group (—NH—CO—O—alkyl), with a diamine of the formula:

(IV)

Insofar as the two $R_1$ in Formula I represent hydrogen, the desired urea derivatives are obtained also by reacting an aromatic amine of the formula:

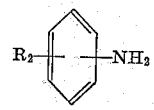
(V)

with a diisocyanate or with a dicarbamic acid derivative of the formula:

$$X—R—X \qquad (VI)$$

wherein R and X have the meaning given above.

In both cases the reaction of the amine with the isocyanate or carbamic acid derivative is suitably carried out in a solvent such as dimethylformamide. If the amine or diamine used as starting material is used in the form of an acid addition salt, e.g. as a hydrochloride, then the reaction is preferably carried out in the presence of an acid binding base such as pyridine. The reaction mixture is suitably left to stand for some hours at room temperature or, if necessary, heated for some time at reflux temperature. To isolate the desired product, the reaction mixture may be treated with water or aqueous alkali metal hydroxide, if desired after concentration by evaporation, the product of which precipitates may be separated as such or in the form of an acid addition salt, and further purified if desired.

Insofar as the urea derivatives obtained according to Formula I contain basic radicals $R_2$ of Formula II they may be converted into the corresponding acid addition salts by treatment with organic or inorganic acids. Examples of such acids are sulphuric acid, hydrochloric acid, hydrobromic acid, phosphoric acid, formic acid, acetic acid, propionic acid, butyric acid, tartaric acid, maleic acid, oxalic acid, citric acid, salicylic acid, methane-sulphonic acid and the like. The salts of hydroxycarboxylic acids, keto-carboxylic acids and amino-carboxylic acids, especially the salts of glycollic acid, lactic acid, saccharic acid, mucic acid, ascorbic acid, heptagluconic acid, galactosido-gluconic acid, galactosido-heptagluconic acid, laevulinic acid and glutaminic acid, are distinguished by their especially good solubility.

Those urea derivatives of Formula I in which $R_2$ denotes a cyano or an esterified carboxyl group may, if desired, subsequently be converted into therapeutically active compounds of Formula I wherein $R_2$ signifies the basic radical of the Formula II by known methods. For example, the dinitrile (I; $R_2$=—CN) is first treated with hydrogen sulphide and then with a diamine of the formula:

$$H_2H—R_3—NH_2 \qquad (VII)$$

The treatment with hydrogen sulphide may be carried out in dimethylformamide solution in the presence of a strong base such as pyridine or triethylamine at room temperature. The dithioamide formed in the process may be precipitated with water and heated without solvent to about 110° C. with an excess of the desired diamine. The product is isolated in the usual manner.

On the other hand the dinitrile (I; $R_2$=—CN) can be converted by treatment with alcoholic hydrochloric acid into the imido ether which on reacting with the diamine (VII) also yields the dibasic urea derivative.

The dicarboxylic acid diester (I; $R_2$=—COOR', where R' is preferably an alkyl or aralkyl residue) can be converted into the dibasic urea derivative by treatment with the diamine (VII), preferably in the presence of ammonium chloride, at increased temperature (preferably over 200° C.), provided that the final product does not decompose at the reaction temperature.

For the preparation of therapeutically active urea derivatives of Formula I wherein $R_2$ is the basic radical (II) it may be advantageous to proceed via the dinitrile or the dicarboxylic acid diester if the corresponding starting materials of Formula III or V with nonbasic radical $R_2$ are more readily accessible or more stable than those with basic radical $R_2$.

Example 1

17.0 g. of hexyl diisocyanate are added, with stirring, to a solution of 46.8 g. of 2-(p-aminophenyl)-2-imidazoline dihydrochloride in 200 ml. dimethylformamide and 20 ml. pyridine. After leaving to stand for 2 hours, the reaction mixture is heated to 80° C. and the solvent is evaporated off in vacuo. The residue is stirred with 150 ml. 2 N sodium hydroxide with addition of ice. The base which separates out is filtered with suction and washed with cold water. The product is dissolved, while still moist, in 250 ml. 2 N warm acetic acid, the solution is filtered and the filtrate is treated with about 50 ml. concentrated hydrochloric acid. After cooling, the hydrochloride which separates is filtered with suction and washed with acetone and ether. After drying, 43 g. colourless 1,1'-hexamethylenebis[3-(p-2-imidazolin-2-ylphenyl)-urea] dihydrochloride of melting point 332° C. (with recomposition) is obtained.

Example 2

14.0 g. of p-cyanophenyl isocyanate are dissolved in 100 ml. absolute dioxane and treated portionwise with a solution of 3 g. ethylene diamine in 20 ml. absolute dioxane. The mixture heats up, and a precipitate forms. The mixture is heated for another 4 hours on a steam bath left to cool, and treated with 300 ml. water. The solid formed is isolated by filtration, washed with water, methanol and ether and dried in vacuo. 15 g. of 1,1'-ethylenebis[3-(4-cyanophenyl)urea] are obtained.

15 g. of this compound are suspended in 30 ml. of dimethylformamide and 15 ml. of piperidine. Hydrogen sulphide gas is passed into this suspension for 15 minutes. The clear solution obtained is left to stand overnight and then treated with 100 ml. water. A precipitate is formed which is washed with water and dried in vacuo. 15 g. of 1,1'-ethylenebis[3 - (4 - thiocarbamidophenyl)urea] of melting point 265° C. are obtained.

15 g. of this bis-thioamide are heated together with 20 g. ethylene diamine for 1 hour at 110° C. The free base separates from the clear solution after a short time. The reaction mixture is treated with 100 ml. of water, the precipitate is isolated by filtration and washed with water. The product, while still moist, is dissolved in 150 ml. 2 N warm acetic acid. The solution is filtered till clear with addition of charcoal and treated with hot 30 ml. concentrated hydrochloric acid. After cooling, the separated salt is filtered with suction and washed with water and methanol. After drying, 16 g. of 1,1'-ethylenebis[3-(p-2-imidazolin-2-ylphenyl)urea] dihydrochloride with decomposition point 360° C. are obtained.

Example 3

14.5 g. of p-cyanophenylisocyanate, dissolved in 150 ml. absolute dioxane, are treated portionwise with a solution of 10.0 g. of 1,12-diamindodecane in 50 ml. absolute dioxane. The reaction mixture is heated for one hour on a steam bath, diluted with 100 ml. acetone and after cooling, the precipitate formed is isolated by filtration and washed with acetone. After drying, 23 g. of 1,1'-dodecamethylenebis[3-(p-cyanophenyl)urea] are obtained.

This dinitrile is suspended in 100 ml. dimethylformamide and 20 ml. piperidine, and hydrogen sulphide gas is passed into the suspension for 15 minutes. The clear solution is left to stand overnight and then treated with 100 ml. water, the precipitated product is filtered with suction and washed with water. After drying, 25 g. of 1,1'-dodecamethylenebis[3 - (p - thiocarbamidophenyl)urea] are obtained.

To convert this into 1,1'-dodecamethylenebis[3-(p-2-imidazolin - 2 - ylphenyl)urea], the above thioamide is mixed with 25 g. ethylenediamine and heated for 2 hours on a steam bath. After a short time, the free base separates from the clear solution. The solution is diluted with 100 ml. water, the product is separated by suction filtration and washed with water. The product is dissolved, while still moist, in 200 ml. of 2 N hot acetic acid, filtered with addition of charcoal, and the solution is treated while still hot with 20 ml. of concentrated hydrochloric acid. After cooling, the solid is separated by filtration and washed with dilute hydrochloric acid and with acetone. After drying, 12 g. of 1,1'-dodecamethylenebis[3-(p-2-imidazolin-2-ylphenyl)urea] dihydrochloride of melting point 185° C. are obtained.

The products given in the following table are obtained by proceeding in the same way as in the above examples.

| Example | Product | Melting point, ° C. |
|---|---|---|
| 4 | 1,1'-trimethylenebis[3-(p-2-imidazolin-2-ylphenyl)urea] dihydrochloride. | 1 360 |
| 5 | 1,1'-propylene-1,2-bis[3-(p-2-imidazolin-2-ylphenyl)urea] dihydrochloride. | 1 245 |
| 6 | 1,1'-tetramethylenebis[3-(p-[1,4,5,6-tetrahydro-2-pyrimidinyl]phenyl)urea] dihydrochloride. | 1 310 |
| 7 | 1,1'-pentamethylenebis[3-(p-2-imidazolin-2-ylphenyl)urea] dihydrochloride. | 1 298 |
| 8 | 1,1'-pentamethylenebis[3-(p-[1,4,5,6-tetrahydro-2-pyrimidinyl]phenyl)urea] dihydrochloride. | 1 230 |
| 9 | 1,1'-octamethylenebis[3-(p-2-imidazolin-2-ylphenyl)urea] dihydrochloride. | 1 215 |
| 10 | 1,1'-octamethylenebis[3-(p-[1,4,5,6-tetrahydro-2-pyrimidinyl]phenyl)urea]dihydrochloride. | 1 235 |
| 11 | 1,1'-dodecamethylenebis[3-(p-[1,4,5,6-tetrahydro-2-pyrimidinyl]phenyl)urea] dihydrochloride. | 1 195 |
| 12 | 1,1'-(2-hydroxytrimethylene)bis[3-(p-2-midazolin-2-ylphenyl)urea] dihydrochloride. | 1 272 |
| 13 | 1,1'-tetramethylenebis[3-(p-2-imidazolin-2-ylphenyl)urea] dihydrochloride. | 335 |
| 14 | 1,1'-hexamethylenebis[3-(p-[1,4,5,6-tetrahydro-2-pyrimidinyl]phenyl)urea] dihydrochloride. | 1 264 |
| 15 | 1,1'-heptamethylenebis[3-(p-2-imidazolin-2-ylphenyl)urea] dihydrochloride. | 1 305 |
| 16 | 1,1'-heptamethylenebis[3-(p-[1,4,5,6-tetrahydro-2-pyrimidinyl]phenyl)urea] dihydrochloride. | 222 |
| 17 | 1,1'-nonamethylenebis[3-(p-2-imidazolin-2-ylphenyl)urea] dihydrochloride. | 204 |
| 18 | 1,1'-nonamethylenebis[3-(p-[1,4,5,6-tetrahydro-2-pyrimidinyl]phenyl)urea] dihydrochloride. | 195 |
| 19 | 1,1'-decamethylenebis[3-(p-2-imidazolin-2-ylphenyl)urea] dihydrochloride. | 1 244 |
| 20 | 1,1'-decamethylenebis[3-(p-[1,4,5,6-tetrahydro-2-pyrimidinyl]phenyl)urea] dihydrochloride. | 188 |
| 21 | 1,1'-(2-hydroxytrimethylene)bis[3-(p-[1,4,5,6-tetrahydro-5-hydroxy-2-pyrimidinyl]phenyl)urea] dihydrochloride. | 1 242 |
| 22 | 1,1'-trimethylenebis[3-(m-[1,4,5,6-tetrahydro-2-pyrimidinyl]phenyl)urea] dihydrochloride. | 252 |
| 23 | 1,1'-trimethylenebis[3-(m-2-imidazolin-2-ylphenyl)urea] dihydrochloride. | 1 194 |
| 24 | 1,1'-tetramethylenebis[3-(m-2-imidazolin-2-ylphenyl)urea] dihydrochloride. | 1 192 |
| 25 | 1,1'-tetramethylenebis[3-(m-[1,4,5,6-tetrahydro-2-pyrimidinyl]phenyl)urea] dihydrochloride. | 255 |
| 26 | 1,1'-tetramethylenebis[3-(m-4[or 5]-methyl-2-imidazolin-2-ylphenyl)urea] dihydrochloride. | |
| 27 | 1,1'-nonamethylenebis[3-(p-4[or 5]- methyl-2-imidazolin-2-ylphenyl)urea] dihydrochloride | 190 |
| 28 | 1,1'-decamethylenebis[3-(p-4[or 5]-methyl-2-imidazolin-2-ylphenyl)urea] dihydrochlride | 1 195 |
| 29 | 1,1'-decamethylenebis[3-(m-2-imidazolin-2-ylphenyl)urea] dihydrochloride. | 1 180 |
| 30 | 1,1'-decamethylenebis[3-(m-4[or 5]-methyl-2-imidazolin-2-ylphenyl)urea] dihydrochloride. | 210 |
| 31 | 1,1'-decamethylenebis[3-(p-[1,4,5,6-tetrahydro-5-hydroxy-2-pyrimidinyl]phenyl)urea] dihydrochloride. | 155 |
| 32 | 1,1'-dodecamethylenebis[3-(p-4[or 5]-methyl-2-imidazolin-2-ylphenyl)urea] dihydrochloride. | 1 192 |
| 33 | 1,1'-dodecamethylenebis[3-(p-[1,4,5,6-tetrahydro-5-hydroxy-2-pyrimidinyl(phenyl)urea] dihydrochloride. | 2 145 |
| 34 | 1,1'-dodecamethylenebis[3-(m-4[or 5]-methyl-2-imidazolin-2-ylphenyl)urea] dihydrochloride. | 210 |
| 35 | 4',4''-di-2-imidazolin-2-yl-1,4-piperazine-dicarboxanilide dihydrochloride. | 1 345 |
| 36 | 4',4''-bis(1,4,5,6-tetrahydro-2-pyrimidinyl)-1,4-piperazinedicarboxanilide dihydrochloride. | 1 320 |
| 37 | 1,1'-(2-hydroxytrimethylene)bis[3-(p-[1,4,5,6-tetrahydro-2-pyrimidinyl]phenyl)-urea] dihydrochloride. | 1 314 |

| Example | Product | Melting point, °C. |
|---|---|---|
| 38 | 1,1'-dodecamethylenebis[3-(m-[1,4,5,6-tetrahydro-5-hydroxy-2-pyrimidinyl)phenyl)-urea] dihydrochloride. | 175 [5] |
| 39 | 1,1'-decamethylenebis[3-(m-[1,4,5,6-tetrahydro-5-hydroxy-2-pyrimidinyl]phenyl)urea] dihydrochloride. | 185 |
| 40 | 1,1'-decamethylenebis[3-(m-[1,4,5,6-tetrahydro-2-pyrimidinyl]phenyl)urea] dihdrochloride. | 212 |
| 41 | 1,1'-trimethylenebis[3-(p-4[or 5]-methyl-2-imidazolin-2-ylphenyl)urea] dihydrochloride. | 215 |
| 42 | 1,1'-trimethylenebis[3-(p-[1,4,5,6-tetrahydro-5-hydroxy-2-pyrimidinyl]phenyl)urea] dihydrochloride. | 268 |
| 43 | 1,1'-trimethylenebis[3-(p-[1,4,5,6-tetrahydro-2-pyrimidinyl]phenyl)urea] dihydrochloride. | 318 |

[1] With decomposition.
[2] Vitreous.

The new compounds of this invention can be administered in the form of pharmaceutical preparations containing, besides the active substance, organic or inorganic solid or liquid carriers suitable for parenteral administration. The pharmaceutical preparations may, for instance, be in the form of solutions for infusion or injection. In the treatment of animals infected by trypanosomes, it is preferred to administer the compounds s.c or i.m. by injecting an appropriate solution containing about 2 to 20 mg./kg. of the active substance, one single injection of this dose being sufficient to combat the infection.

*Preparation of solutions for infusion*

The following ingredients are mixed together and agitated until a clear solution is obtained:

| | Grams |
|---|---|
| 4',4"-di-2-imidaolin-2-yl-1,4- piperazindicarboxanilide dihydrochloride | 0.1 |
| Dextrose | 50 |
| Bidistilled water | 1000 |

After filtration to remove any remaining solid particles, the solution is heated at 120° C. during 30 minutes and then kept under sterile conditions in a vessel suitable for making infusions.

*Preparation of solutions for injection*

A 20% (weight/weight) solution of 1,1' - heptamethylenebis[3 - (p - [1,4,5,6 - tetrahydro - 2 - pyrimidinyl] phenyl) urea] dimethane sulfonate in bidistilled water containing an appropriate solubilizing agent is prepared, filled in ampoules and heated in the sealed ampoules at 120° C. during 30 minutes.

20 ml. of this solution are injected i.m. to a cow suffering from infection by trypanosomes.

We claim:

1. A member of the class consisting of (A) urea derivatives of the formula:

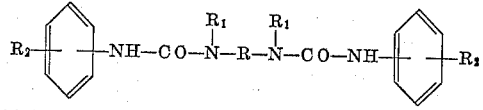

in which R is a member of the group consisting of straight or branched alkylene having from 2 to 12 carbon atoms, and straight or branched monohydroxy alkylene having from 2 to 12 carbon atoms; the two $R_1$ are members of the group consisting of hydrogen and, when taken together, ethylene (in this latter case R being also ethylene, and $R_2$ is a member of the class consisting of cyano alkoxy carbonyl, and a basic residue of the formula:

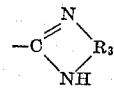

wherein $R_3$ represents a member of the class consisting of straight or branched alkylenes having from 2 to 4 carbon atoms, and straight or branched monohydroxy alkylene having from 2 to 4 carbon atoms; and (B) therapeutically acceptable acid addition salts of urea derivatives (A) having basic residues $R_2$.

2. 1,1' - heptamethylenebis[3 - (p - [1,4,5,6 - tetrahydro - 2 - pyrimidinyl]phenyl)urea] and therapeutically acceptable acid addition salts thereof.

3. 1,1' - nonamethylenebis[3 - (p - [1,4,5,6 - tetrahydro - 2 - pyrimidinyl]phenyl)urea] and therapeutically acceptable acid addition salts thereof.

4. 1,1' - trimethylenebis[3 - (p - 2 - imidazolin - 2 - ylphenyl) - urea] and therapeutically acceptable acid addition salts thereof.

5. 1,1' - 2 - hydroxytrimethylene - bis[3 - (p - 2-imidazolin - 2 - ylphenyl) urea] and therapeutically acceptable acid addition salts thereof.

6. 4'4" - di - 2 - imidazolin - 2 - 1,4 - piperazinedicarboxanilide and therapeutically acceptable acid addition salts thereof.

7. 1,1' - octamethylenebis[3 - (p - 2 - imidazolin - 2-ylphenyl) - urea] and therapeutically acceptable acid addition salts thereof.

No references cited.

ALEX MAZEL, *Primary Examiner.*

M. O'BRIEN, R. GALLAGHER, *Assistant Examiners.*

CERTIFICATE OF CORRECTION

Patent No. 3,337,552                                            August 22, 1967

Rudolf Hirt

It is hereby certified that error appears in the above numbered patent requiring correction and that the said Letters Patent should read as corrected below.

Column 3, line 24, for "recomposition" read -- decomposition --; column 4, in the table, second column, opposite Example 12, for "midazolin" read -- imidazolin --; same table, third column, opposite Example 26, insert -- $^{1}$205 --; column 5, line 36, for "imidaolin" read -- imidazolin --; same line 36, for "piperazindicarboxani" read -- piperazinedicarboxani --; column 6, line 24, for "alkylenes" read -- alkylene --; line 41, for "imidazolin-2-1,4-" read -- imidazolin-2-yl-1,4- --.

Signed and sealed this 12th day of November 1968.

(SEAL)
Attest:

EDWARD M. FLETCHER, JR.                            EDWARD J. BRENNER
Attesting Officer                                                Commissioner of Patents